United States Patent
Kanameda

(10) Patent No.: US 6,502,026 B2
(45) Date of Patent: *Dec. 31, 2002

(54) START CONTROLLING METHOD FOR A PASSENGER PROTECTION SYSTEM, START CONTROLLING SYSTEM FOR A PASSENGER PROTECTION SYSTEM, AND RECORDING MEDIUM FOR RECORDING A START CONTROLLING PROGRAM FOR A PASSENGER PROTECTION SYSTEM

(75) Inventor: Yasumasa Kanameda, Tomioka (JP)

(73) Assignee: Bosch Electronics Corporation, Gunma (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/860,615

(22) Filed: May 21, 2001

(65) Prior Publication Data

US 2001/0021890 A1 Sep. 13, 2001

Related U.S. Application Data

(63) Continuation of application No. 09/291,111, filed on Apr. 14, 1999, now Pat. No. 6,278,923.

(30) Foreign Application Priority Data

May 25, 1998 (JP) ............................................ 10-158656

(51) Int. Cl.$^7$ ............................ B60R 22/00; G06F 7/00

(52) U.S. Cl. ............................. 701/45; 701/36; 701/46; 180/268; 180/271; 180/282; 280/734; 280/735

(58) Field of Search ............................ 701/36, 45, 46; 280/734, 735, 731, 728.1; 180/271, 282, 274, 268; 340/436, 438; 307/10.1

(56) References Cited

U.S. PATENT DOCUMENTS

| | | | |
|---|---|---|---|
| 3,966,224 A | | 6/1976 | Campbell et al. ............ 280/735 |
| 5,014,810 A | * | 5/1991 | Mattes et al. ................ 180/268 |
| 5,083,276 A | * | 1/1992 | Okano et al. .................. 701/45 |
| 5,339,242 A | * | 8/1994 | Reid et al. ..................... 701/45 |
| 5,363,301 A | | 11/1994 | Takeuchi ...................... 701/45 |
| 5,363,303 A | | 11/1994 | Kaneko et al. ................ 701/45 |
| 5,400,487 A | | 3/1995 | Gioutsos et al. ............. 280/735 |
| 5,407,228 A | * | 4/1995 | Shibata et al. .............. 280/735 |
| 5,440,485 A | | 8/1995 | Okimoto et al. .............. 701/46 |
| 5,483,451 A | | 1/1996 | Ohmae et al. ................ 701/46 |
| 5,490,067 A | | 2/1996 | Teguri et al. ................. 701/46 |
| 5,497,327 A | | 3/1996 | Takaya et al. ................ 701/46 |
| 5,530,649 A | | 6/1996 | Fujishima ..................... 701/46 |
| 5,542,700 A | | 8/1996 | Shibata et al. ................ 701/46 |
| 5,587,906 A | | 12/1996 | McIver et al. ................ 701/45 |
| 5,608,628 A | * | 3/1997 | Drexler et al. ................ 701/45 |

(List continued on next page.)

Primary Examiner—Jacques H. Louis-Jacques
(74) Attorney, Agent, or Firm—Wenderoth, Lind & Ponack, L.L.P.

(57) ABSTRACT

If deceleration in excess of a predetermined value is detected (step 104 in FIG. 2), a speed integral value ΔV as time integration of the deceleration is calculated (step 110 in FIG. 2). A segment length of a characteristic curve of the speed integral value ΔV in a predetermined range is calculated (steps 112, 114 in FIG. 2). If it is decided that the segment length is smaller than a predetermined value $l_2$ (step 116 in FIG. 2), the crash is decided as the low speed crash, etc. other than a soft crash. An air bag is inflated if the speed integral value ΔV exceeds a predetermined threshold value $V_{TH}$, whereas the speed integral value ΔV is incremented by a predetermined value α (step 118 in FIG. 2) if it is decided that the segment length exceeds $l_2$ (step 116 in FIG. 2). Then, if it is decided that the speed integral value ΔV exceeds the threshold value $V_{TH}$ (step 112 in FIG. 2), inflation of the air bag is executed to detect generation of the soft crash.

8 Claims, 5 Drawing Sheets

U.S. PATENT DOCUMENTS

| | | | |
|---|---|---|---|
| 5,668,740 A | 9/1997 | Want et al. | 340/436 |
| 5,742,916 A | 4/1998 | Bischoff et al. | 701/45 |
| 5,802,480 A | 12/1998 | Shiraishi | 701/45 |
| RE36,122 * | 3/1999 | Mattes et al. | 180/268 |
| RE36,122 * | 3/1999 | Mattes et al. | 180/268 |
| 5,897,599 A | 4/1999 | Takeuchi | 701/46 |
| 5,999,871 A | 12/1999 | Liu | 701/45 |
| 6,005,479 A | 12/1999 | Ide | 340/438 |
| 6,018,980 A * | 2/2000 | Kimura et al. | 73/12.04 |
| 6,036,225 A | 3/2000 | Foo et al. | 701/45 |
| 6,104,973 A * | 8/2000 | Sugiyama et al. | 701/46 |
| 6,170,864 B1 * | 1/2001 | Fujita et al. | 280/735 |
| 6,243,633 B1 * | 6/2001 | Kanameda et al. | 701/45 |
| 6,278,923 B1 * | 8/2001 | Kanameda | 701/45 |

* cited by examiner

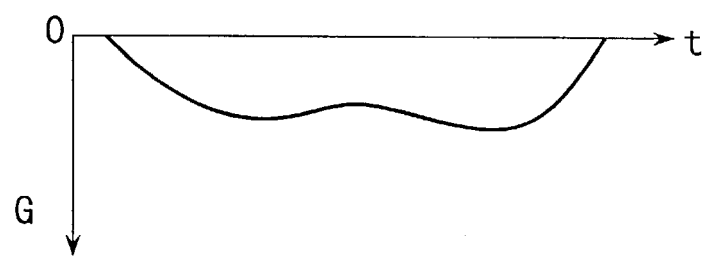
FIG. 4(A)
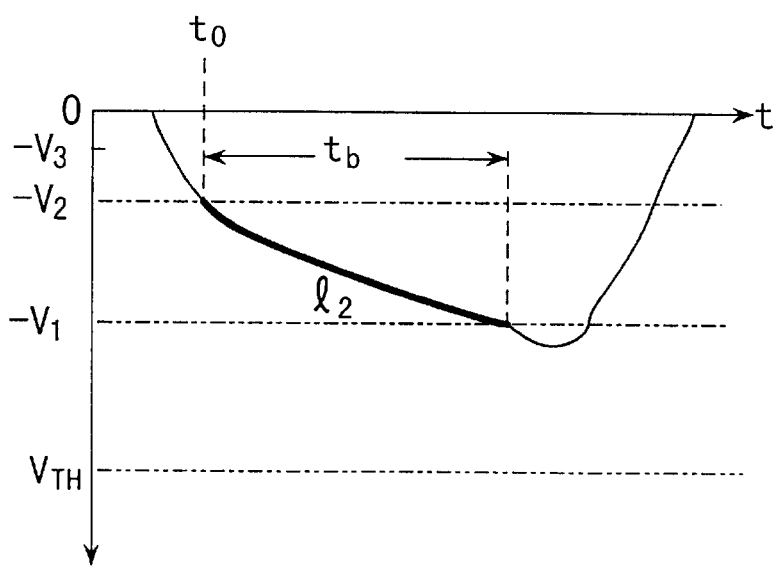
FIG. 4(B)
FIG. 5
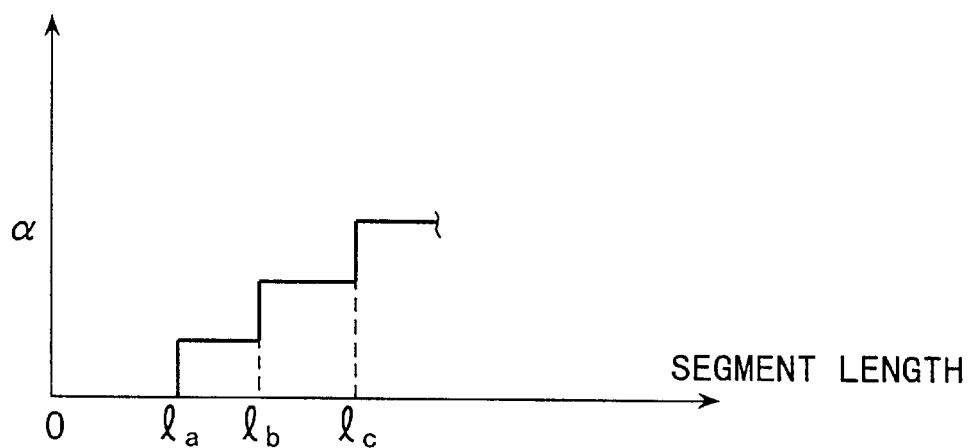

START CONTROLLING METHOD FOR A PASSENGER PROTECTION SYSTEM, START CONTROLLING SYSTEM FOR A PASSENGER PROTECTION SYSTEM, AND RECORDING MEDIUM FOR RECORDING A START CONTROLLING PROGRAM FOR A PASSENGER PROTECTION SYSTEM

This application is a Continuation application of Ser. No. 09/291,111 filed Apr. 14, 1999, now U.S. Pat. No. 6,278,923.

BACKGROUND OF THE INVENTION

1. Field of the Invention

The present invention relates to control of a passenger protection system for protecting passengers in a car crash and, more particularly, a start controlling method for a passenger protection system and a start controlling system for a passenger protection system. Both are able to distinguish between a low speed crash and a soft crash, and a recording medium for recording a start controlling program for a passenger protection system.

2. Description of the Related Art

In the prior art, it has been well known that, according to the running speed and the crashed part of the vehicle, type of crash of the vehicle is classified into a low speed frontal crash wherein an entire frontal area of the vehicle collides with an object at low speed, a high speed frontal (head-on) crash wherein the entire frontal area of the vehicle collides with the object at high speed, a high speed offset crash wherein a part of the entire frontal area of the vehicle collides with the object at high speed, and others.

In a passenger protection system represented by an air bag system, for example, which can protect a body of the passenger in such crash, normally it is designed that such start control should be executed by taking account of difference in the acceleration of the vehicle in a crash from that in normal running. Various start controlling methods and systems for embodying the same, etc. have been proposed up to now.

A following concept has been proposed as one of start control concepts for the passenger protection system which has been proposed until now. In other words, at first the integral value (speed integral value) of the deceleration (so-called impact acceleration) upon crash is calculated. Then, it is decided whether or not change in the integral value within a predetermined range is continued over a predetermined period of time, i.e., it is decided whether or not stagnation of the integral value is caused. If it has been decided that the stagnation of the integral value is caused, a predetermined value is then added to the integral value. Therefore, the integrated value is advanced rather than the actual integral value, and then start of the air bag is carried out when it is decided that the integrated value has exceeded a predetermined threshold value.

In the meanwhile, while taking account of the stagnation of the speed integral value which is caused in the crash which is generally called as a soft crash such as an oblique crash, an offset crash, a pole crash, etc., the above start controlling method has been proposed to start the airbag without fail, while distinguishing between the soft crash and the high speed crash in which no stagnation of the speed integral value is caused, etc. However, such start controlling method has not been satisfactory in the following respects and therefore has not been employed in practical use.

More particularly, there has been the low speed crash as the case where start of the air bag is not needed. In such low speed crash, change in the speed integral value of the impact acceleration has the stagnation of the speed integral value, like the above-mentioned soft crash. In addition, sometimes a stagnation time of the speed integral value in the low speed crash is close to or resembles that in the soft crash. Therefore, in some cases there has been a possibility that distinctions between the soft crash and the low speed crash become difficult to determine according to the above concep.

SUMMARY OF THE INVENTION

The present invention has been made in view of the above circumstances, and it is an object of the present invention to provide a start controlling method for a passenger protection system which is suited for practical use and a system for embodying the same, and a recording medium for recording a start controlling program for a passenger protection system.

It is another object of the present invention to provide a start controlling method for a passenger protection system which is able to distinguish between a soft crash and a low speed crash to thus achieve higher practicality and a system for embodying the same, and a recording medium for recording a start controlling program for a passenger protection system.

In order to achieve the above objects of the present invention, according to a first aspect of the present invention, there is provided a start controlling method for a passenger protection system, of controlling start of the passenger protection system which is constructed such that a protection system for protecting passengers in a vehicle is started in response to a start signal supplied from an external device, comprising the steps of:

executing integral of deceleration of a vehicle with respect to time;

calculating a segment length of change in an integral value in a predetermined range of the integral value, which is derived by the integral of time, relative to an elapsed time; and deciding type of crash by comparing a calculated value of the segment length with a reference value.

Such start controlling method is made based on a following viewpoint. That is, based on the result of study perfomrd by inventors of the present invention, the stagnation of the integral value is caused in a certain interval of change in the speed integral value as integration of the deceleration with respect to time according to type of crash. The segment length of the integral value relative to the elapsed time becomes different according to the type of crash even in the case where such stagnation of the integral value is caused, so that the types of crashes can be distinguished from each other based on the difference in the segment length.

It is preferable that, when the segment length is to be calculated, the predetermined range of the integral value should be defined by a point of start of the stagnation of the integral value, i.e., the integral value at a start point, and a point of termination of the stagnation of the integral value, i.e., the integral value at an end point. In practice, it is preferable that, since the values are different according to type of the vehicle, etc., such values should be set based on experimental data, or set by taking account of various conditions, etc. as well as experimental data.

More particularly, the present invention is suitable for distinction between the so-called soft crash such as an oblique crash, a pole crash, etc., which needs start of the passenger protection system, and the low speed crash, which does not need start of the passenger protection system.

Therefore, it is preferable that the above reference value should be set to the segment length of change in the integral value in a predetermined range of the integral value, which is derived by the integral of time of the deceleration of the vehicle in a low speed crash, relative to the elapsed time. The type of crash should be decided as the soft crash if the segment length which is larger than the reference value has been calculated.

In order to achieve the above objects of the present invention, according to a second aspect of the present invention, there is provided a start controlling system for a passenger protection system, for controlling start of the passenger protection system which is constructed such that a protection system for protecting passengers in a vehicle is started in response to a start signal supplied from an external device, comprising:

a deceleration deciding means for deciding whether or not deceleration which is input from an external means exceeds a predetermined magnitude;

an integrating means for executing integral of time of the deceleration which is input from the external means to calculate a speed integral value if it has been decided by the deceleration deciding means that the deceleration exceeds the predetermined magnitude;

a segment length calculating means for calculating a segment length in a predetermined range of the speed integral value which is calculated by the integrating means, relative to an elapsed time;

a segment length deciding means for deciding whether or not the segment length which has been calculated by the segment length calculating means exceeds a predetermined value;

an incrementing means for adding a predetermined increment value to the speed integral value at that point of time if it has been decided by the segment length deciding means that the segment length which has been calculated by the segment length calculating means exceeds the predetermined value; and a decision starting means for generating a start signal for the passenger protection system if it has been decided that a value derived by the incrementing means exceeds a predetermined threshold value.

Such configuration is implemented by the start controlling method set forth in claim 1 so as to enable the start of the passenger protection system. The deceleration deciding means, the integrating means, the segment length calculating means, the segment length deciding means, the incrementing means, and the decision starting means can be implemented by causing the so-called CPU, which has a function of a computer, to execute the predetermined program.

It is preferable that, when the segment length is to be calculated, the predetermined range of the integral value should be defined by a point of start of the stagnation of the integral value, i.e., the integral value at a start point, and a point of termination of the stagnation of the integral value, i.e., the integral value at an end point. In practice, it is preferable that, since the values are different according to type of the vehicle, etc., such values should be set based on experimental data, or set by taking account of various conditions, etc., as well as experimental data.

In addition, the decision starting means may be composed of a threshold value deciding means for deciding whether or not a value derived by the incrementing means exceeds a predetermined threshold value, and a start signal generating means for generating a start signal for the passenger protection system if it has been decided by the threshold value deciding means that the value derived by the incrementing means exceeds the predetermined threshold value.

In order to achieve the above objects of the present invention, according to a third aspect of the present invention, there is provided a start controlling system for a passenger protection system, for controlling start of the passenger protection system which is constructed such that a protection system for protecting passengers in a vehicle is started in response to a start signal supplied from an external device, comprising:

a central processing unit for reading a predetermined program from another external device and then executing predetermined processes by executing the predetermined program;

a memory device for storing a program which is to be executed by the central processing unit in such a manner that the program can be read by the central processing unit;

a digital/analogue converter for converting a digital start signal, which is supplied from the central processing unit to an air bag system, into an analogue signal; and an interface circuit for converting an output signal of the digital/analogue converter into a predetermined signal which is suited for the air bag system;

wherein the central processing unit executes integral of time of deceleration of the vehicle, which is input from an external means, calculates a segment length of change in an integral value in a predetermined range of the integral value, which is derived by the integral of time, relative to an elapsed time, compares a calculated value of the segment length with a reference value which is the segment length of change in the integral value in a predetermined range of the integral value, which is derived by the integral of time of the deceleration of the vehicle in a low speed crash, relative to the elapsed time, decides that type of crash is a soft crash if it has been decided that the calculated value of the segment length is larger than the reference value, decides whether or not a speed integral value exceeds a predetermined threshold value if it has been decided that the type of crash is the soft crash, and outputs a start signal of an air bag system if it has been decided that the speed integral value exceeds the predetermined threshold value.

In order to achieve the above objects of the present invention, according to a fourth aspect of the present invention, there is provided a recording medium for recording a plurality of computer-readable instructions, comprising:

a first instruction means for causing a computer to decide whether or not deceleration which is input from an external means exceeds a predetermined magnitude;

a second instruction means for causing the computer to execute integral of time of the deceleration to calculate a speed integral value if it has been decided that the deceleration which is input from the external means exceeds the predetermined magnitude;

a third instruction means for causing the computer to calculate a segment length in a predetermined range of the speed integral value being calculated, relative to an elapsed time;

a fourth instruction means for causing the computer to decide whether or not the segment length being calculated exceeds a predetermined value;

a fifth instruction means for causing the computer to add a predetermined increment value to the speed integral value at that point of time if it has been decided that the segment length being calculated exceeds the predetermined value;

a sixth instruction means for causing the computer to decide whether or not the speed integral value, to which the predetermined increment value is added, exceeds a predetermined threshold value; and a seventh instruction means for causing the computer to generate a start signal to start a passenger protection system if it has been decided that the speed integral value exceeds the predetermined threshold value.

BRIEF DESCRIPTION OF THE DRAWINGS

FIGS. 3A and 3B are views showing a characteristic curve of change in deceleration and its integral of time value in a soft crash, respectively, wherein FIG. 3A is a characteristic curve showing change in the deceleration relative to an elapsed time, and FIG. 3B is a characteristic curve showing change in integral of time of the deceleration shown in FIG. 3A relative to the elapsed time;

FIGS. 4A and 4B are views showing a characteristic curve of change in deceleration and its integral of time value in a low speed crash, respectively, wherein FIG. 4A is a characteristic curve showing change in the deceleration relative to the elapsed time, and FIG. 4B is a characteristic curve showing change in integral of time of the deceleration shown in FIG. 4A relative to the elapsed time;

FIG. 5 is a graph showing a concrete example of an increment variable α which is to be added to a speed integral value.

DETAILED DESCRIPTION OF THE PREFERRED EMBODIMENTS

Preferred embodiments of the present invention will be explained in detail with reference to the accompanying drawings hereinafter.

Members, arrangements, etc. described in the following should be interpreted not to limit the present invention, and therefore they may be varied or modified variously in the range of the essence of the present invention. At first, a basic configuration of a start controlling system for a passenger protection system according to an embodiment of the present invention (referred to as the "present system" hereinafter) will be explained with reference to FIG. 1 hereinbelow.

At first, a basic configuration of a start controlling system for a passenger protection system according to an embodiment of the present invention (referred to as the "present system" hereinafter) will be explained with reference to FIG. 1 hereinbelow.

Figure 1:
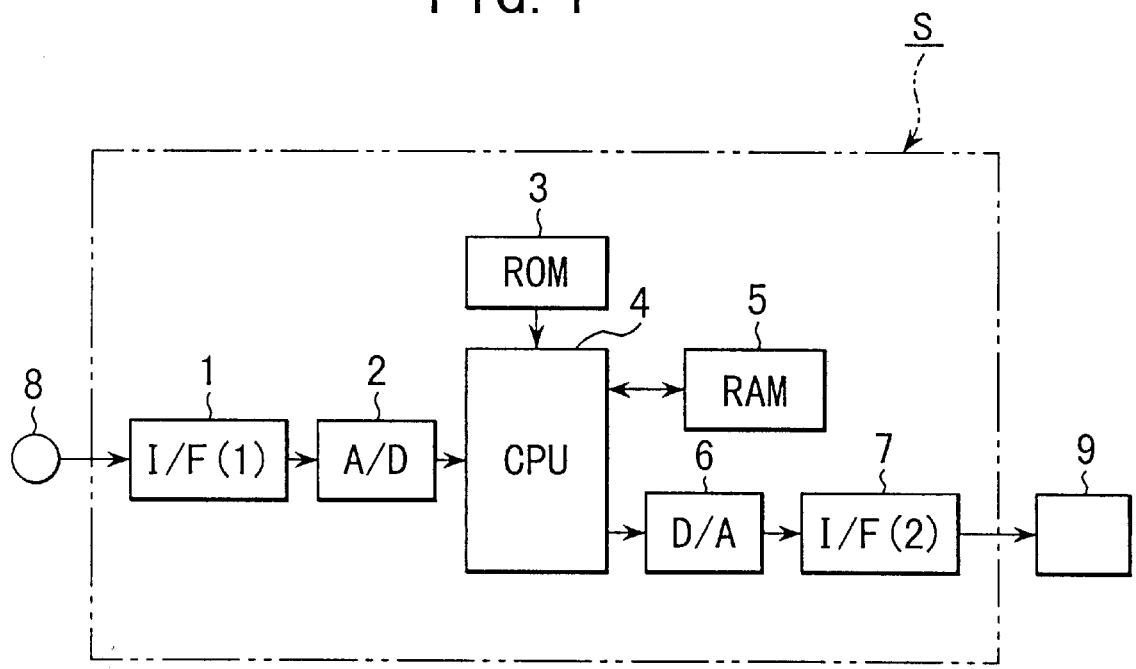
FIG. 1 is a schematic block diagram showing a configuration of a start controlling method for a passenger protection system according to an embodiment of the present invention.

As shown in FIG. 1, a hardware configuration of the present system S comprises a first interface circuit (labeled as an "I/F (1)" in FIG. 1) 1, an analogue/digital converter (labeled as an "A/D" in FIG. 1) 2 for converting an analogue signal into a digital signal, a ROM (Read Only Memory) 3, a central processing unit (labeled as a "CPU" in FIG. 1) 4, a RAM (Random Access Memory) 5, a digital/analogue converter (labeled as an "D/A" in FIG. 1) 6 for converting a digital signal into an analogue signal, and a second interface circuit (labeled as an "I /F (2)" in 5 FIG. 1) 7. As described later, the present system S is constructed to control start of an air bag system 9 acting as the passenger protection system, based on acceleration detected by an acceleration sensor 8 upon a car crash (i.e., deceleration).

The first interface circuit 1 executes a level conversion of a signal being input from the acceleration sensor 8. An output signal of the first interface circuit 1 is converted into the digital signal by the analogue/digital converter 2 and then input into the central processing unit 4.

The ROM 3 is a well known IC memory device which is employed only to read data. The program, constants, etc. which are employed to implement a start controlling operation described later are stored in advance in this ROM 3.

The central processing unit 4 controls an overall operation of the present system S described later. For example, the central processing unit 4 is constructed to employ a well known IC microcomputer (CPU). In place of the CPU, a DSP (Digital Signal Processor) which is well known as an integrated circuit to make high speed processing possible may be employed.

The RAM 5 is a well known IC memory device which is employed to store/read results of arithmetic operations performed by the central processing unit 4, etc.

The second interface circuit 7 acts as an interface between the present system S and the air bag system 9. More particularly, when the digital start signal which is output from the central processing unit 4 is converted into the analogue signal by the digital/analogue converter 6 and then the analogue signal is input into the second interface circuit 7, various processes, e.g. signal level conversion of the analogue signal to be fit for the air bag system 9, are conducted by the second interface circuit 7 and then such analogue signal is output to the air bag system 9.

As the typical acceleration sensor, there are a semiconductor acceleration sensor, a piezoelectric acceleration sensor, etc. The acceleration sensor 8 of the present system S should not be limited to a particular type of acceleration sensor, and any type of acceleration sensor may be employed in the present invention.

The air bag system 9 is a well known one which consists of an inflator (gas generator) (not shown) and an air bag main body. The air bag system 9 is constructed such that, when the start signal is input from the present system S, a gas is generated by the inflator to inflate the air bag main body.

Next, procedures in start control carried out by the central processing unit 4 will be explained with reference to FIG. 2 hereunder.

Figure 2:
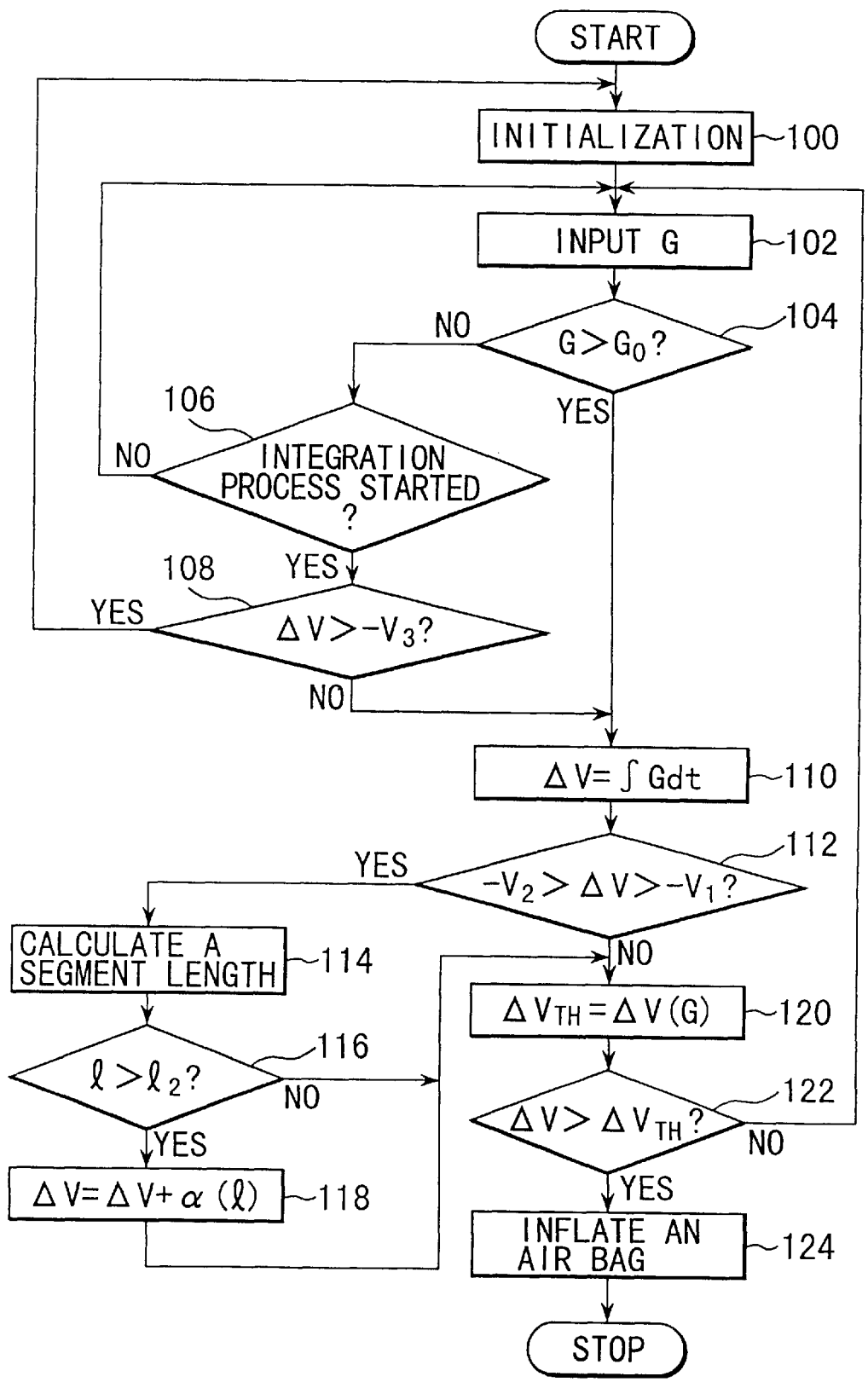
FIG. 2 is a flowchart showing procedures in start control carried out by the start controlling method for the passenger protection system shown in FIG. 1.

When an operation of the central processing unit 4 is started, at first various variables, flags, etc. are initialized (see step 100 in FIG. 2).

The deceleration G detected by the acceleration sensor 8 is then input (see step 102 in FIG. 2). It is then decided whether or not the deceleration G exceeds predetermined deceleration Go (see step 104 in FIG. 2).

The predetermined deceleration Go is set to a value of the deceleration which is not generated in a normal running state of the vehicle. For example, the predetermined deceleration Go is decided by taking account of various empirical conditions, as well as experimental data. The deceleration G has a negative value. Such deceleration G is increased larger to the negative side as the impact caused by the crash becomes stronger. Therefore, in the embodiment of the present invention, the meaning of "the deceleration G is increased" is "the deceleration G has a more negative value", i.e. "an absolute value of the deceleration G is increased".

Assume that the deceleration G and the deceleration Go have the absolute value, respectively, in an inequality G>Go in step 104.

In step 104, if it has been decided that G>Go (if YES), i.e. if it has been decided that the deceleration G is larger than the predetermined deceleration Go, the process goes to step 110 described later. In contrast, unless it has been decided that the deceleration G is larger than the predetermined deceleration Go (if NO), i.e., if it has been decided that the deceleration which is regarded as the crash has not been generated yet, then it is decided whether or not integration process (see step 110 in FIG. 2) described j later has already been started (see step 106 in FIG. 2).

On the contrary, in step 106, if it has been decided that the integration process has already been started (if YES), then it is decided whether or not a speed integral value $\Delta V$ which is an integral of time value of the deceleration is larger than a predetermined value $-V3$ (see step 108 in FIG. 2).

Then, if it has been decided that the speed integral value $\Delta V$ is larger than the predetermined value $-V3$, i.e., if it has been decided that the speed integral value $\Delta V$ has a value closer to the positive side than the predetermined value $-V3$ (if YES), the process returns to step 100 since there is no need to start the air bag system. Then, a series of processes are started newly (see step 108 in FIG. 2).

In this case, the predetermined value $-V3$ is selected to such extent that the vehicle is not brought into a state wherein the air bag system 9 must be started and thus, the vehicle is able to run without trouble. Thus, the predetermined value $-V3$ may be set experimentally or set by adding various conditions to experimental data. For example, in FIG. 4A, a characteristic curve showing change in the deceleration relative to the elapsed time in a low speed crash is depicted. In FIG. 4B, a characteristic curve showing change in the integral of time value of the deceleration relative to the elapsed time is depicted. The predetermined value $-V3$ will be explained with reference to FIGS. 4A and 4B in the following.

In FIG. 4B, as described later, values $-V1$ and $-V2$ are levels of the speed integral value $\Delta V$ which is one of references to determine a low speed crash in this start control. The above value $-V3$ is set to a level smaller than these values $-V1$ and $-V2$ (in other words, set to a value more close to the positive side) (see FIG. 4B).

In contrast, in step 108, if it has been decided that $\Delta V > -V3$ is not satisfied (if NO), i.e., if it has been decided that the speed integral value $\Delta V$ has the more negative side value than the value $-V3$, the process advances to step 110. Then, in step 110, the speed integral value $\Delta V$ is calculated by integrating the deceleration G, which is input by the process in step 102, with respect to time (see step 110 in FIG. 2).

Then, it is decided whether or not the calculated speed integral value $\Delta V$ is suppressed within a predetermined range (see step 112 in FIG. 2). More particularly, it is then decided whether or not an inequality $-V2 > \Delta V > -V1$ is satisfied.

Next, the principle of the start controlling method in the embodiment of the present invention as well as respective meanings of $-V1$ and $-V2$ in the above inequality will be explained with reference to FIGS. 3A and 3B and FIGS. 4A and 4B hereunder.

The start controlling method in the embodiment of the present invention is constructed such that it is able to distinguish the type of crash which needs the start of the air bag system 9 and which is called, generally, a soft crash, and the low speed crash which does not need the start of the air bag system 9. In the soft crash such as an oblique crash, an offset crash, a pole crash, etc., stagnation is caused in the speed integral value. In particular, the start controlling method in the embodiment makes it possible to distinguish the soft crash and the low speed crash by taking notice of the factor described in the following.

In the prior art, as one of the concepts of the start control of the air bag system for the soft crash, there has been start control which is decided based on whether or not the stagnation is caused in the speed integral value $\Delta V$.

Figure 3A:
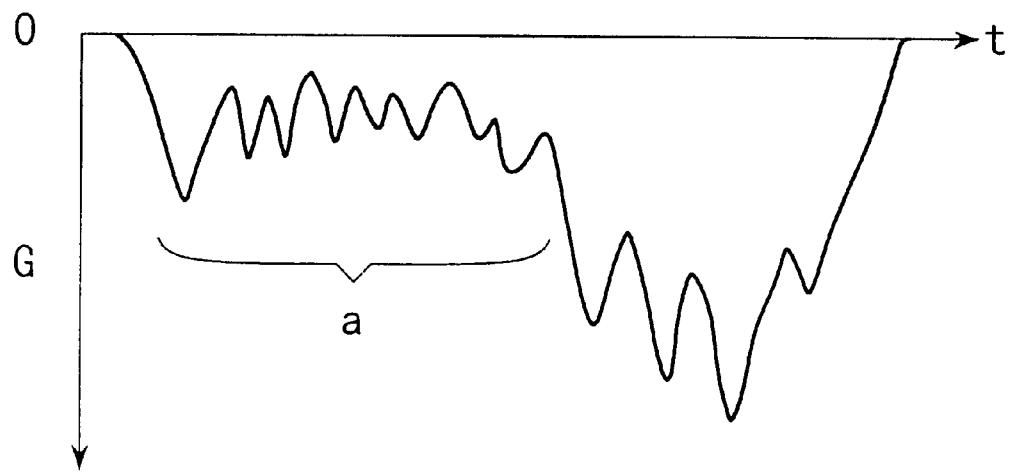
Figure 3B:
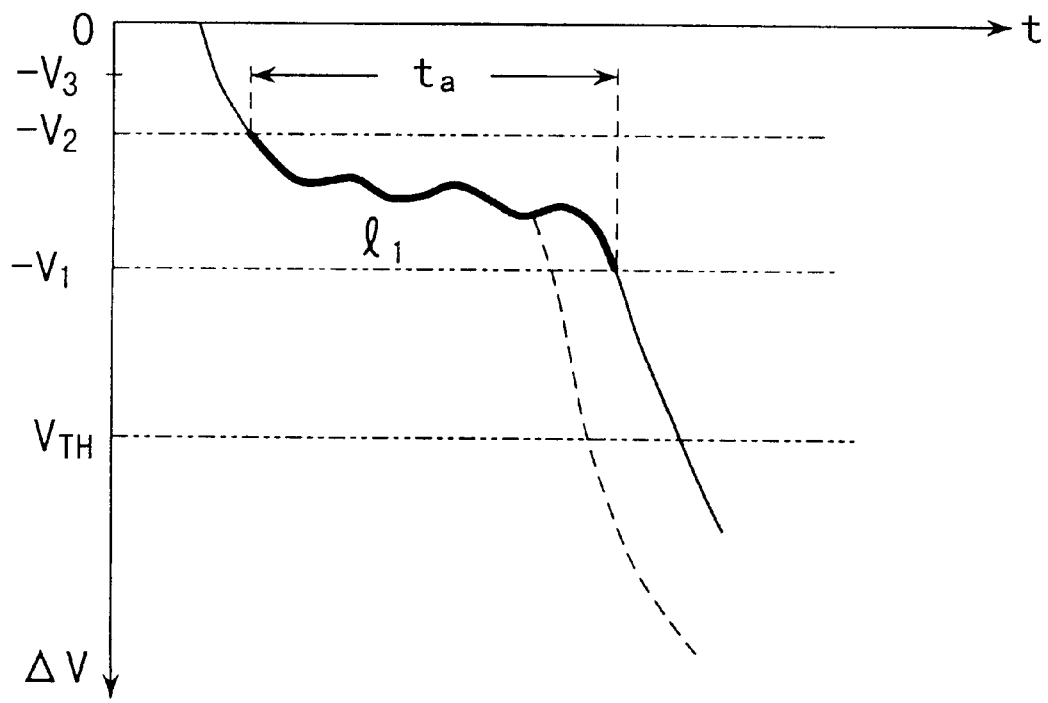

In other words, in FIGS. 3A and 3B, change in the deceleration in the soft crash and a typical example of the speed integral value $\Delta V$ which is the integral of time value of the change in the deceleration are shown respectively. In the case of the soft crash, as shown in FIG. 3A, in most cases the decelerations are generated successively at a relatively small level (see a time interval indicated by a reference a in FIG. 3A) and then the relatively large deceleration which has a plurality of peaks is caused. Then, as shown in FIG. 3B, the speed integral value $\Delta V$ is relatively loosely changed in a time interval which corresponds to the above time interval indicated by the reference a to thus cause the stagnation of the speed integral value $\Delta V$. Then, change in the speed integral value $\Delta V$ is also enhanced in response to appearance of the relatively large deceleration (see FIG. 3A).

For this reason, in the prior art, there has been the following concept of start control with regard to such change in the speed integral value $\Delta V$. That is, a period of time which is required for the speed integral value $\Delta V$ to pass through the predetermined value $-V2$ and then come up to the predetermined value $-V1$ is detected. If the time exceeds a predetermined period of time ta, the type of crash is decided as the soft crash. Thus, a predetermined value is added to the speed integral value $\Delta V$ (a characteristic 10 curve indicated by a broken line in FIG. 3B represents the speed integral value after the addition has been executed) so as to make the speed integral value $\Delta V$ exceed positively a threshold value $V_{TH}$. Where the predetermined value $-V2$ is a speed integral value which substantially corresponds to a start point of the time interval during when the deceleration of relatively small level is successively generated, as indicated by the reference a in FIG. 3A, for example, and the predetermined value $-V1$ is a speed integral value which substantially corresponds to an end point of the above time interval. That is to say, the predetermined value $-V2$ is an integral value at a point of start, i.e., a start point of the stagnation of the integral value, while the predetermined value $-V1$ is an integral value at a point of termination, i.e., an end point of the stagnation of the integral value.

However, in the start control in the prior art, there has been a possibility that a disadvantage is caused as described in the following.

More particularly, in the low speed crash, as the representative example is shown in FIG. 4A, the deceleration seldom has a peak and becomes continuous around a certain level. But, as shown in FIG. 4B, the stagnation is caused in the integral of time value of the deceleration, like the case of the above-mentioned soft crash. In addition, a period of time tb, which is required for the speed integral value ΔV to pass through from the predetermined value −V2 to −V1, tends to have a value relatively similar to the predetermined period of time ta in the case of the above soft crash.

Therefore, in the event of the above-mentioned concept of start control, the low speed crash cannot be distinguished from the soft crash even if such low speed crash which does not need inflation of the air bag is caused. As a result, there is a possibility of bringing about the start of the air bag. Therefore, the above start control in the prior art has not been employed in practical use.

As the result of earnest study to find differences in changes in the deceleration, the speed integral value, etc. between the soft crash and the low speed crash, the inventors of the present invention have come to the conclusion that the soft crash and the low speed crash can be distinguished from each other, based on a difference in segment lengths of the characteristic curve showing the change in the speed integral value. Thus, the start controlling method in the embodiment of the present invention is made based on such viewpoint.

More specifically, as for the change in the speed integral value in the soft crash and the low speed crash, if changes in respective characteristic curves are compared with each other within a same predetermined range, e.g., the range of the speed integral value from −V2 to −V1 in FIGS. 3B and 4B respectively, the speed integral value ΔV is directed to −V1 relatively smoothly with the elapsed time in the low speed crash, whereas the speed integral value ΔV is directed to −V1 with variation of the integral value in the soft crash. In other words, it is possible to say that the segment length of the speed integral value from −V2 to −V1 in the soft crash becomes long rather than that in the low speed crash. Therefore, the start controlling method in the passenger protection system according to the present invention can distinguish between the soft crash and the low speed crash according to such difference in the segment length of the characteristic curve of the speed integral value within the predetermined range, and thus can provide a more practical start controlling method than the prior art.

Returning to FIG. 2 again, if it has been decided in step 112 that the inequality −V2>ΔV>−V1 is satisfied (if YES), the segment length l is calculated in the predetermined range from −V2 to −V1 (see step 114 in FIG. 2).

More specifically, for example, if an infinitesimal segment length at a time t is assumed as Δ Lt, first such infinitesimal segment length at a time t can be calculated as $\Delta Lt=\{1+(\Delta Vt-\Delta_{(t-1)})^2\}^{1/2}$. Where ΔVt is the speed integral value at a time t, and $\Delta V_{(t-1)}$ is the speed integral value at a time t−1 prior to the time t by a predetermined time (e.g., one clock of the CPU). Here assume that a time interval between ΔVt and $\Delta V_{(t-1)}$ is small enough to be approximated to 1, and a right-angled triangle has an oblique side of the infinitesimal segment length ΔLt and two orthogonal sides of a difference between ΔVt and $\Delta V_{(t-1)}$ and the time interval 1. Hence, this equation corresponds to calculate a length of the oblique side of the right-angled triangle. The segment length l of the speed integral value from −V2 to −V1 can be calculated by integrating the infinitesimal segment length ΔLt with respect to time. An interval of integration is the time interval in which the speed integral value passes through −V2 to come up to −V1.

After the segment length l has been calculated as described above, it is decided whether or not this segment length l is larger than a predetermined value l2 (see step 116 in FIG. 2). Where the value $l_2$ is a segment length in the characteristic curve of the speed integral value in the predetermined range of the speed integral value, i.e., the range of the speed integral value from −V2 to −V1 in the low speed crash (see FIG. 4B). This value is set experimentally or set by adding various conditions, etc. to experimental data. The value is stored previously in the ROM 3 and then fetched by the central processing unit 4 as a reference value in decision.

In step 116, if it has been decided that the segment length l is not larger than the predetermined value $l_2$ (if NO), neither the soft crash nor the low speed crash is detected as the type of crash and then the process goes to step 120 described later. In contrast, if it has been decided that the segment length l is larger than the predetermined value $l_2$ (if YES), a value of an increment variable α is added to the speed integral value ΔV at that point of time and then such added value is set newly as the speed integral value ΔV at this point of time (see step 118 in FIG. 2).

Where the increment variable α is set and added from a point of view described in the following. That is, in decision whether or not inflation of the air bag is requested, as described later (see step 122 in FIG. 2), since a threshold value employed to decide whether or not the magnitude of the speed integral value reaches such a magnitude that needs inflation of the air bag is determined based on a high speed head-on crash, the increment variable α is added to enable the speed integral value ΔV to exceed the threshold value even in the soft crash which is a type of crash other than the high speed head-on crash. This increment variable α is detected and set in advance experimentally according to the type of vehicle. For example, as shown in FIG. 5, the increment variable α is set to change stepwise based on the magnitude of the segment length calculated in step 114. In FIG. 5, la, lb, and lc are segment lengths respectively, in the characteristic curve of the speed integral value from the point of time after the speed integral value ΔV has passed through the predetermined value −V2 (see FIG. 3B), and are appropriately set respectively.

In practice, values of the segment lengths and corresponding values α are tabulated as a conversion table based on the above characteristic curve. Then, such conversion table is previously stored in a memory (not shown) in the central processing unit 4 or the ROM 3 to be employed in step 118.

In this case, a portion of the characteristic curve indicated by the broken line in FIG. 3B shows a change in the speed integral value ΔV to which the increment variable α is added, as described above.

Then, if it has been decided in above step 112 that the inequality −V2>ΔV>−V1 is not satisfied (if NO), or if it has been decided in above step 116 that the inequality l>$l_2$ is not satisfied (if NO), or if the above step 118 has been finished, then the threshold value $V_{TH}$ is decided in step 120.

In other words, the threshold value $V_{TH}$ which is employed as a reference value to decide whether or not the speed integral value ΔV reaches the magnitude to start the air bag system 9 is calculated by using a previously set relation based on a magnitude of the deceleration G at this point of time, otherwise the threshold value $V_{TH}$ is fetched from a table in which relationships between the decelerations G and the threshold values $V_{TH}$ are stipulated and then set. In step 122, $\Delta V_{TH}$=ΔV (G) means that $\Delta V_{TH}$ is a function of the deceleration G. A concrete relation between G and $\Delta V_{TH}$ is omitted herein. But, roughly speaking, according to the relation, for example, the level of the deceleration G at which the air bag system 9 is started in the high speed head-on crash is set based on simulation data derived experimentally or by the computer. An appropriate level of the deceleration G is set for every type of vehicle.

Then, it is decided whether or not the speed integral value $\Delta V$ exceeds the threshold value $\Delta V_{TH}$ being set as above (see step 122 in FIG. 2). If it has been decided that the speed integral value $\Delta V$ exceeds the threshold value $\Delta V_{TH}$ (if YES), inflation of the air bag is needed. Thus, the start signal is output from the central processing unit 4 to the air bag system 9 via the digital/analogue converter 6 and the second interface circuit 7, so that the air bag is inflated (see step 124 in FIG. 2). On the contrary, in step 122, if it has been decided that the speed integral value $\Delta V$ does not exceed the threshold value $\Delta V_{TH}$ (if NO), the speed integral value $\Delta V$ does not require inflation of the air bag and thus, the process returns to above step 102. Then, as described above, a series of processes are repeated once again (see step 122 in FIG. 2).

In the above explanation, a deceleration deciding means can be implemented by causing the central processing unit 4 to execute step 104 shown in FIG. 2, an integrating means can be implemented by causing the central processing unit 4 to execute step 110 shown in FIG. 2, a segment length calculating means can be implemented by causing the central processing unit 4 to execute step 114 shown in FIG. 2, a segment length deciding means can be implemented by causing the central processing unit 4 to execute step 116 shown in, FIG .2, an incrementing means can be implemented by causing the central processing unit 4 to execute step 118 shown in FIG. 2, and a decision starting means can be implemented by causing the central processing unit 4 to execute steps 122 and 124 shown in FIG. 2.

The decision starting means may consist of a threshold value deciding means and a start signal generating means. In this case, the threshold value deciding means can be implemented by causing the central processing unit 4 to a execute step 122 shown in FIG. 2, and the start signal generating means can be implemented by causing the central processing unit 4 to execute step 124 shown in FIG. 2.

In the above explanation, the above start control is carried out on the premise that the program for executing the start control is previously stored in the ROM 3. However, there is no necessity that the program should always be previously stored in the ROM 3. That is to say, the program can be first stored in a well known external storing medium, and then the central processing unit 4 can read the program from this storing medium when the start control is to be carried out.

In more detail, a magnetic recording medium such as a floppy disk, a hard disk, a magnetic tape, an optical disk, and the like, for example, may be employed as such a storing medium. It is a matter of course that, if such recording medium is employed, the suitable reading device (e.g., the floppy disk drive, the hard disk drive, or the like) must also be installed.

Figure 6:
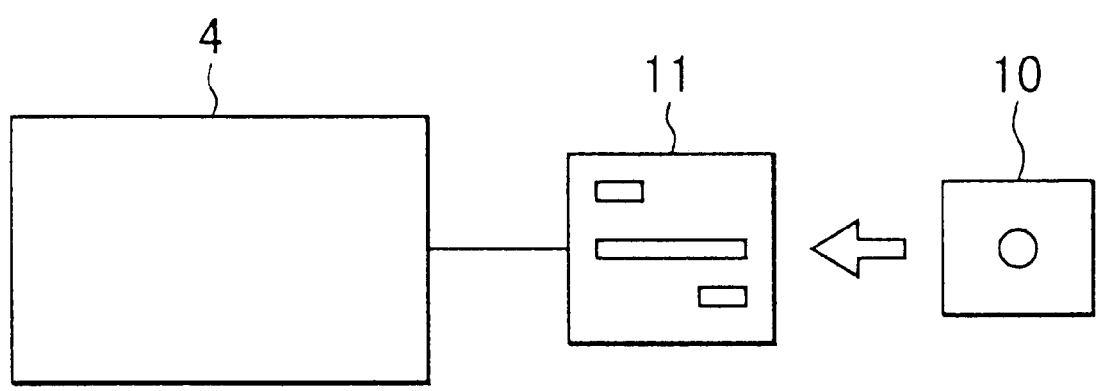
FIG. 6 is a schematic view showing a configuration of a start controlling system for a passenger protection system when a floppy disk is employed to load a program.

In FIG. 6, an example of a configuration of a start controlling system is shown in the case where a floppy disk 10 is employed as the recording medium for the program. A reading operation of the program when the floppy disk 10 is employed as the recording medium will be explained with reference to FIG.6 hereinbelow.

A floppy disk drive 11 is connected to the central processing unit 4. The program is loaded in advance onto the floppy disk 10. The program can be fetched from the floppy disk 10 by operating the floppy disk drive 11, and then loaded onto the central processing unit 4, so that the program is ready for use.

As described above, according to the present invention, since the start controlling system is constructed to discriminate between the difference in the segment length within the predetermined range of the elapsed time in the characteristic curve of the speed integral value as the time integration of the deceleration, respective types of crashes can be discriminated between even in the type of crash in which the stagnation of the speed integral value is caused.

Especially, the soft crash and the low speed crash can be distinguished from each other, and therefore, the start controlling method for the passenger protection system and the system therefor, which is able to have higher practicality than the prior art, and the recording medium for recording the start controlling program for the passenger protection system can be provided.

What is claimed is:

1. A start controlling method for controlling a start of a passenger protection system for protecting passengers in a vehicle, the passenger protection system being started in response to a start signal, said start controlling method comprising:

calculating a speed integral value by integrating a deceleration of the vehicle with respect to time;

calculating a value of a segment length of change in an integral value in a predetermined range of the speed integral value relative to an elapsed time; and deciding a type of crash by comparing the value of the segment length with a reference value.

2. A start controlling system for controlling a start of a passenger protection system for protecting passengers in a vehicle, the passenger protection system being started in response to a start signal, said start controlling system comprising:

a deceleration deciding means for deciding whether or not a deceleration of the vehicle exceeds a predetermined magnitude;

an integrating means for integrating the deceleration with respect to time to calculate a speed integral value if it has been decided by said deceleration deciding means that the deceleration exceeds the predetermined magnitude;

a segment length calculating means for calculating a value of a segment length of change in a predetermined range of the speed integral value relative to an elapsed time;

a segment length deciding means for deciding whether or not the value of the segment length exceeds a predetermined value;

an incrementing means for adding a predetermined increment value to the speed integral value at a point in time to derive a value if it has been decided by the segment length deciding means that the value of the segment length exceeds the predetermined value; and a decision starting means for generation the start signal for the passenger protection system if the value derived by said incrementing means exceeds a predetermined threshold value.

3. A start controlling system according to claim 2, wherein said decision starting means comprises:

a threshold value deciding means for deciding whether or not the value derived by said incrementing means exceeds the predetermined threshold value; and a start signal generating means for generating the start signal for the passenger protection system if it has been decided by said threshold value deciding means that the value derived by said incrementing means exceeds the predetermined threshold value.

4. A start controlling system according to claim 2, wherein the predetermined value employed by said segment length deciding means is a segment length of change in an integral value in a predetermined range of another speed integral value, the another speed integral value being derived from an integral of time of deceleration of the vehicle in a low speed crash, relative to the elapsed time.

5. A starting controlling system according to claim 3, wherein the predetermined value employed by said segment length deciding means is the segment length of change in an integral value in a predetermined range of another speed integral value, the another speed integral value being derived from an integral of time of deceleration of the vehicle in a low speed crash, relative to the elapsed time.

6. A start controlling system for controlling a start of a passenger protection system for protecting passengers in a vehicle, the passenger protection system being started in response to a start signal, said start controlling system comprising:

a central processing unit operable to:
  read a predetermined program and execute predetermined processes by executing the predetermined program,
  calculate a speed integral value by integrating a deceleration of the vehicle with respect to time,
  calculate a value of a segment length of change in an integral value in a predetermined range of the speed integral value relative to an elapsed time,
  compare the value of the segment length with a reference value, the reference value being a segment length of change in an integral value in a predetermined range of another speed integral value, the another speed integral value being derived from an integral of time of deceleration of the vehicle in a low speed crash relative to the elapsed time,
  decide that a type of crash is a soft crash if the value of the segment length is larger than the reference value,
  decide whether or not the speed integral value exceeds a predetermined threshold value if it has been decided that the type of crash is the soft crash, and
  output a digital start signal for the passenger protection system if it has been decided that the speed integral value exceeds the predetermined threshold value;

a memory device operable to store a program to be executed by said central processing unit, such that the program can be read by said central processing unit;

a digital/analogue converter operable to convert the digital start signal supplied from said central processing unit into an analogue signal; and an interface circuit operable to convert the analogue signal from said digital/analogue converter into a predetermined signal which is suited for the passenger protection system.

7. A computer program embodied on a computer readable medium for use with a computer for controlling a start of a passenger protection system for protecting passengers in a vehicle, said computer program comprising:

computer readable program code operable to cause the computer to decide whether or not a deceleration exceeds a predetermined magnitude;

computer readable program code operable to cause the computer to integrate the deceleration with respect to time to calculate a speed integral value if it has been decided that the deceleration exceeds the predetermined magnitude;

computer readable program code operable to cause the computer to calculate a value of a segment length of an integral value of change in a predetermined range of the speed integral value relative to an elapsed time;

computer readable program code operable to cause the computer to decide whether or not the value of the segment length exceeds a predetermined value;

computer readable program code operable to cause the computer to add a predetermined increment value to the speed integral value at a point in time if it has been decided that the value of the segment length exceeds the predetermined value;

computer readable program code operable to cause the computer to decide whether or not a sum of the speed integral value and the predetermined increment value exceeds a predetermined threshold value; and computer readable program code operable to cause the computer to generate a start signal for starting the passenger protection system if it has been decided that the speed integral value exceeds the predetermined threshold value.

8. A computer program according to claim 7, wherein the predetermined value is a segment length of change in an integral value in a predetermined range of another speed integral value, the another speed integral value being derived from an integral of time of deceleration of the vehicle in a low speed crash, relative to the elapsed time.

* * * * *